United States Patent
Chareyre

(10) Patent No.: US 6,857,674 B2
(45) Date of Patent: Feb. 22, 2005

(54) DEVICE AND SYSTEM FOR FILTERING VIBRATIONAL MOVEMENTS OF A PASSENGER SUPPORT, AND PASSENGER SUPPORT EQUIPPED WITH SUCH A SYSTEM

(75) Inventor: Philippe Chareyre, Cugnaux (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/655,512

(22) Filed: Sep. 3, 2003

(65) Prior Publication Data

US 2004/0056501 A1 Mar. 25, 2004

(30) Foreign Application Priority Data

Sep. 19, 2002 (FR) .............................................. 02 11610

(51) Int. Cl.⁷ .................................................. B60J 9/00
(52) U.S. Cl. ................ 296/1.03; 296/65.02; 296/65.13; 248/421; 248/424
(58) Field of Search ............................ 296/1.03, 65.02, 296/65.01, 63, 65.13; 297/341, 340, 344.16; 248/430, 424, 421, 398, 550

(56) References Cited

U.S. PATENT DOCUMENTS

| | | | | |
|---|---|---|---|---|
| 3,006,594 A | * | 10/1961 | Gruendler ................... | 248/424 |
| 3,136,524 A | * | 6/1964 | Pickles ........................ | 248/424 |
| 3,632,076 A | | 1/1972 | Rogers ........................ | 248/371 |
| 4,003,534 A | | 1/1977 | Kenigsberg et al. ........ | 244/122 |
| 4,183,492 A | | 1/1980 | Meiller ........................ | 248/395 |
| 4,344,597 A | * | 8/1982 | Eimen ......................... | 248/430 |
| 5,127,699 A | * | 7/1992 | Maezawa et al. ........ | 296/65.02 |
| 5,366,196 A | * | 11/1994 | Mitschelen et al. ......... | 248/421 |
| 5,374,022 A | * | 12/1994 | Gilmer et al. .............. | 248/398 |
| 5,765,803 A | * | 6/1998 | Graham .................... | 296/65.13 |
| 6,152,533 A | * | 11/2000 | Smuk ......................... | 297/341 |
| 6,340,152 B1 | * | 1/2002 | Ritchie et al. ......... | 297/344.16 |
| 6,371,456 B1 | * | 4/2002 | Ritchie et al. .............. | 248/550 |
| 6,616,116 B1 | * | 9/2003 | Rochau et al. ............. | 248/421 |
| 6,729,594 B2 | * | 5/2004 | Ikegaya ...................... | 248/421 |
| 6,749,169 B2 | * | 6/2004 | Becker et al. .............. | 248/421 |

FOREIGN PATENT DOCUMENTS

| | | |
|---|---|---|
| DE | 195 03 660 | 7/1996 |
| FR | 1335575 | 7/1963 |

* cited by examiner

*Primary Examiner*—Kiran Patel
(74) *Attorney, Agent, or Firm*—Thelen Reid & Priest LLP

(57) ABSTRACT

The articulated device (10) that is intended for filtering vibrational movements from a vehicle floor (12) and transmitted to a passenger support (19), is installed between said floor (12) and said support (19), and comprises two mounts (20) fixed to the vehicle floor (12), one mobile central part (22) articulated to the support (19), two connecting rods (24), each articulated to one of the mounts (20) and the central part (22). These five elements (20, 22, 24) are articulated to each other and to the support (19) by rotation joints, the rotations operating about five rotation axes (32, 34, 36) that are parallel to each other.

The system (100) for filtering vibrational movements transmitted to a passenger support (19) comprises at least three filtering devices (10), such that the support (19) moves in translation along a plane curved trajectory.

To be used for an aircraft seat.

24 Claims, 2 Drawing Sheets

DEVICE AND SYSTEM FOR FILTERING VIBRATIONAL MOVEMENTS OF A PASSENGER SUPPORT, AND PASSENGER SUPPORT EQUIPPED WITH SUCH A SYSTEM

CROSS-REFERENCE TO RELATED APPLICATION

This application claims priority to French application no. 02 11610, filed on Sep. 19, 2002 entitled: "Device and System for Filtering Vibrational Movements of a Passenger Support, and Passenger Support Equipped with Such a System" and was not published in English.

1. Technical Field

The technical field of this invention relates to passenger supports in a vehicle, and particularly filtering of vibrational movements of a vehicle seat.

A passenger support usually denotes a seat installed in a vehicle, but the term support also naturally includes other passenger furniture elements such as a bed or a bench.

One particular application of the invention is filtering of vibrational movements of aircraft seats, said vibrational movements being generated by vibrations originating from the aircraft fuselage and propagating to the seats through the floor.

It is to be remembered that filtering of vibrations originating from the floor consists of confining vibrational energy to the floor, limiting the transmission of said vibrations to passenger supports. Therefore, filtering of vibrations is not the same as damping of vibrations.

This invention relates to an articulated device inserted between the vehicle floor and the passenger support that filters movements from the support transmitted through the vehicle floor, enabling said support to move along a predetermined and controlled trajectory.

It is also aimed at a system for filtering movements of a passenger support due to vibrations originating from the floor of the vehicle and transmitted to the passenger support, that implements such articulated devices.

Finally, it includes a passenger support equipped with a system according to the invention.

Note that in this case the term "passenger" means "transported person" and implicitly includes the vehicle service personnel, if any.

2. State of Prior Art

During the transport of passengers in vehicles, changes to the trajectory of the vehicle, and obstacles passed over by vehicles, and propulsion means, can all generate forces that are transmitted to passenger supports, and subsequently to the passengers themselves.

Attempts are usually made to improve the passenger comfort by reducing these forces or their effects.

For example, in the case of transport by train, going around curves quickly generates centrifugal forces and lateral forces in particular. Document DE 19 503 660 A1 describes a device designed to improve passenger comfort by reducing the effects of said centrifugal and lateral forces, and by damping the induced lateral oscillations. This device may be located between the ground, namely the vehicle floor and the seat bottom, and it replaces the legs of said seat. It comprises different components such as bearings, coupling rods, and positioning and damping elements that form one or several four-element kinematic chains arranged transversely to the seat. When this device is in service, the passenger seat is capable of tilting laterally about a dummy tilting point (D) located above its centre of gravity.

In the case of transport by aircraft, this situation is quite different. When in flight, an aircraft is subject to various disturbances that activate the load bearing surfaces (wings, tail fin, etc.) and/or the propulsion installations. Vibrations generated by these disturbances are propagated through the fuselage to the floor of the aircraft cabin, and then to the passenger supports. These vibrations generate physiological problems for passengers, for example malaise, nausea, discomfort, etc., that can very seriously inconvenience them.

The use of the device described in DE 19 503 660 would have the effect that lateral vibrations transmitted to the passenger support through the floor would be felt at the location of the dummy point (D), in other words at the same level as the passenger's head, which is not satisfactory from the point of view of comfort. This disadvantage makes the device described in DE 19 503 660 unsuitable for use for passenger transport in an aircraft.

SUMMARY OF THE INVENTION

An aim of this invention is to overcome the disadvantages mentioned above with the device according to prior art.

This aim is achieved using a device and system capable of filtering vibrations originating from the aircraft floor.

Vibrations transmitted to a passenger support are filtered by controlling movements of the passenger support so that it makes small displacements along a predetermined and controlled trajectory, said trajectory being contained in a plane.

The filtering system according to the invention is composed of at least one device which consists of an articulated chain enabling this small displacement of the support along a plane trajectory.

In the case of an aircraft, it is observed that passenger support movements generated by fuselage vibrations occur mainly in a transverse plane perpendicular to the centre line of the fuselage. The device and system according to the invention are capable of filtering vibrational movements transmitted to the passenger support in a preferred plane, which may in particular be a transverse plane.

According to the invention, the articulated device that will form part of a system for filtering vibrational movements from a vehicle floor and transmitted to a passenger support, is installed between said floor and said support and comprises the following five elements:

- two mounts attached to the vehicle floor,
- one mobile central part articulated to the support,
- two connecting rods, each articulated to one of the mounts and to the central part.

These five elements are articulated to each other and to the support by rotation links, the rotations operating about five rotation axes, said rotation axes being parallel to each other, such that the rotation axis between the mobile central part and the support moves in translation along a curved trajectory contained in a plane that is perpendicular to the plane of the floor.

This type of device has the advantage that it is easy to implement, while remaining reliable.

The articulated device may be installed such that the five rotation axes are perpendicular to the longitudinal plane of symmetry of the vehicle. In this case, authorized displacements of the passenger support are contained within a longitudinal plane of the vehicle.

The articulated device may also be installed such that the five rotation axes are parallel to the longitudinal plane of symmetry of the vehicle. In this case, allowable displacements of the passenger support are contained within a transverse plane of the vehicle.

Preferably, when the vehicle is an aircraft, the articulated device is installed on the aircraft floor, with the rotation axes oriented along a longitudinal direction of said vehicle, so as to filter movements of the passenger support in a transverse plane.

Preferably, the articulated device is installed between the floor and a lower part of the support, said lower part being attached to the seat bottom.

According to one preferred embodiment of the invention, the lower part of the support is a support leg, for example a seat leg. In this case, the system for filtering movements of a passenger support caused by vibrations from the vehicle floor and transmitted to the passenger support, is composed of at least one articulated device like that mentioned above, each device being inserted between the vehicle floor and one of the legs of the support. Thus, when the support is provided with a single leg, the system only has one device. It is preferable if the support is provided with at least three legs, for stability reasons. In this case, the system comprises at least three devices. Similarly, when the support is provided with four legs, the system comprises four devices, etc.

According to another preferred embodiment of the invention, the lower part of the support fastened to the seat bottom is a plate positioned so as to be substantially parallel to the floor and fastened to the legs of the support. In this case, each device forming part of the filtering system is inserted between the vehicle floor and said plate. This arrangement has the advantage that it avoids increasing the height of the support excessively when it is equipped with a system according to the invention. In particular, the support legs can then even be shortened or even eliminated.

One advantage of the device and the filtering system according to the invention is due to the fact that the efficiency of the filtering system is independent of the mass supported by it, in other words the mass of the seat, plus the weight of the passenger if applicable.

Optionally, the device according to the invention and the system according to the invention are equipped with at least one blocking or locking means or mechanism. When said blocking or locking means or mechanism is activated, the filtering device, respectively the filtering system, is made inoperative. On the other hand, when said blocking or locking means or mechanism is not activated, the filtering device, respectively the filtering system, filter vibrational movements originating from the vehicle floor and transmitted to the passenger support with which said filtering device, respectively said filtering system, is associated.

BRIEF DESCRIPTION OF THE DRAWINGS

The invention will be better understood from the following description of preferred embodiments, that are supplied as non-limitative examples of the invention, taken in conjunction with the accompanying drawings in which.

DETAILED PRESENTATION OF PREFERRED EMBODIMENTS

Figure 1:
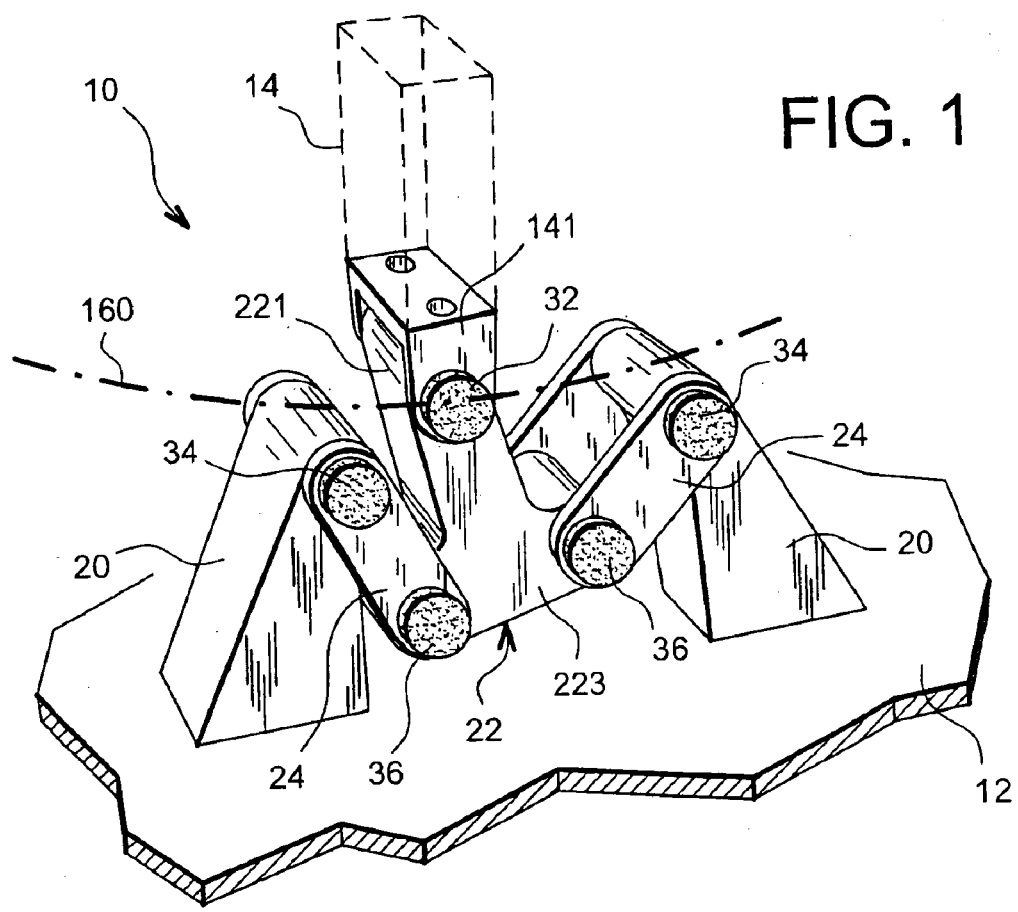
FIG. 1 shows a perspective view of a device according to the invention installed under a support leg.

With reference to FIG. 1, the device 10 is installed between the floor 12 of the vehicle and a lower part 14 fixed to a support of the vehicle (not shown in FIG. 1).

The device 10 comprises:

two mounts 20 fastened to the vehicle floor 12, a central part 22 in the shape of an inverted "T", articulated to the lower part 14, two connecting rods 24, each articulated firstly to one of the mounts 20 and secondly to the central part 22.

Preferably, the connecting rods 24 are double rods.

In the example shown in FIG. 1, the lower part 14 of the vehicle support is a support leg 14 shown as dashed lines. A clevis 141 is fastened to the bottom of this leg 14, that forms an intermediate adapter part in which a rotation axis 32 can be fitted for its articulation with the free end of the portion forming the longitudinal bar 221 of the "T" of the central part 22.

Each double connecting rod 24 is articulated to one of the fixed mounts 20 through one of its ends. The joint is made by rotation about a rotation axis 34 that is also fixed.

Each double connecting rod 24 is also articulated at its other end to one of the ends of the portion 223 forming the transverse bar of the "T" of the central part 22. Each of these two joints is made by rotation about a rotation axis 36 that is movable.

The device 10 is configured such that the rotation axes 32, 34 and 36 are parallel to each other and parallel to the plane of the floor 2.

The thicknesses of the double connecting rods 24, the longitudinal bar 221 of the "T" and the transverse bar 223 of the "T" are appropriate to support the rotation axes 32, 36 through a means enabling a rotation movement, for example such as a roller bearing, a journal bearing or an elastic pivot. According to one alternative, said means enabling a rotation movement is fitted with an external shock absorber. The rotation axes 34 are also supported in the mounts 20 by means allowing a rotation movement, that may be equipped with an external shock absorber.

The double connecting rods 24, the longitudinal bar 221 of the "T" and the transverse bar 223 of the "T" thus form segments of a kinematic chain for which the overall movement is contained within an (Y, Z) plane perpendicular to both the (X, Y) plane of the floor 12 and the rotation axes 32, 34, 36 of the device 10.

Figure 2:
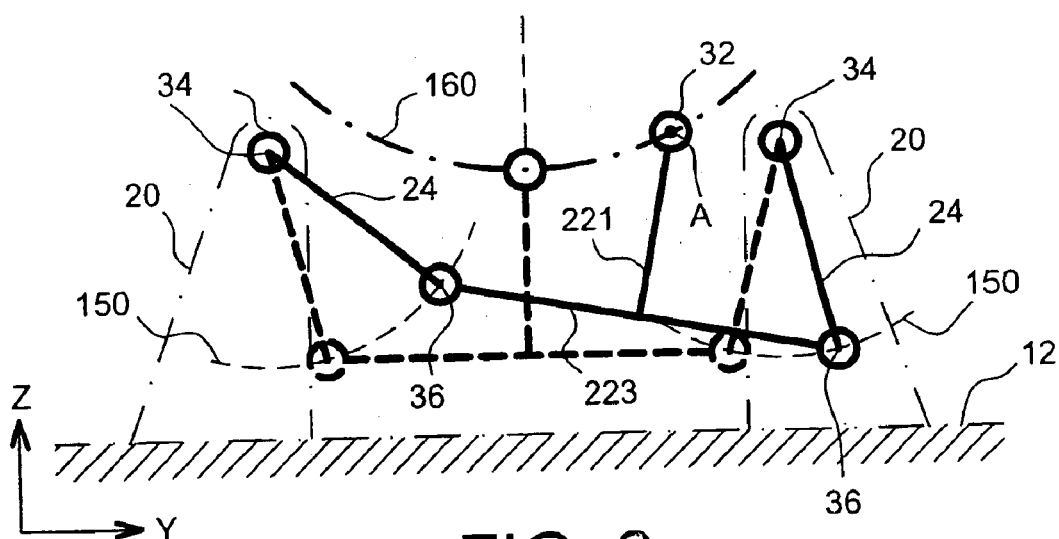
FIG. 2 is a functional diagram showing the kinematics of the device in FIG. 1, in the plane of the displacements.

The kinematics of the device 10 is illustrated diagrammatically in FIG. 2.

The axes of an orthonormal coordinate system (X, Y, Z) are shown in FIG. 2 and on the following FIGS. 3 and 4, and are defined as follows:

the (X, Y) plane is the plane of the floor 12, the Z direction is perpendicular to the plane of the floor 12, the X direction is the direction common to axes 32, 34, 36 of the device 10.

This figure shows allowable rotation movements of the different segments 221, 223, 24 about the different rotation axes 32, 34, 36, in the (Y, Z) plane of displacements. It also shows the resultant trajectory 160 of a point A on the rotation axis 32 common to the central part 22 and the leg 14.

The displacements of segments 221, 223 and 24 are shown between a rest or equilibrium position materialized by dashed lines, and a displaced position materialized by solid lines.

In order to facilitate understanding, the mounts 20 are shown in chain dotted lines and the numeric references have only been shown in the displaced position (solid lines) of the device 10.

Each rotation axis 34 of one end of each double connecting rod 24 with respect to a mount 20 is fixed, since it is attached to the corresponding mount 20 and the mount itself is fixed. Consequently, the rotation axis 36 of the other end of said double connecting rod 24 moves along a circular trajectory 150.

The "T" shaped central part 22 is movable. Its movement is imposed by circular trajectories 150 of rotation axes 36 located at each end of the transverse bar 223 of the "T".

When the central part 22 moves, each point A on the rotation axis 32 of the end of the longitudinal bar 221 of the "T" passes along a curved trajectory 160 contained in a (Y, Z) plane perpendicular to the (X, Z) plane of the floor 12.

This curved trajectory of the rotation axis 32 can be controlled and modified by modifying the distance between the two fixed rotation axes 34 of the fixed mounts 22, and/or by modifying the distance between each of these fixed rotation axes 34 and the plane of the floor 12, and/or by modifying the length of the segments 24, 221, 223.

According to the embodiment of the device 10 showed in FIGS. 1 and 2, the fixed rotation axes 34 are each located at the same distance from the plane of the floor 12, and the distance between the two rotation axes 34, 36 of the double connecting rods 24 is the same, such that in the rest or equilibrium position of the device 10, the transverse bar 223 of the "T" of the central part 22 is parallel to the plane of the floor 2.

Still according to the embodiment of the device 10 showed in FIGS. 1 and 2, the distance between the fixed rotation axes 34 is less than the sum of the lengths of the two double connecting rods 24 and the transverse bar 223 of the "T" of the central part 22. Thus, during movement of the central part 22, the transverse bar 223 of the "T" remains located between the plane of the floor and a plane passing through the two fixed axes 34. With this preferred configuration, the trajectories 150 and 160 are oriented such that they are convex facing the floor 2 and the lower part 14 of the support returns to the rest or the stable equilibrium position under the action of gravity, when no other force is applied to it.

The bottom of the support, and consequently the support itself, are moved as part of an overall movement with the lower part 14.

Now will be described the filtering system according to the invention and two alternatives of the configuration of this system between the floor 2 of the vehicle and the bottom of the support, with reference to FIGS. 3 and 4.

The system 100 according to the invention comprises at least one articulated device 10 like that described above and installed between the floor 12 of the vehicle and a lower part 14, 40, 18 of the support 19. Said lower part may advantageously be a leg 14 of the support or an intermediate common plate 40 (that will be described later), or even the bottom 18 of the support 19.

When the system 100 only includes a single device 10, this system has to be completed by additional stop means to limit displacements of said lower part of the support.

This is why, according to the invention, it is preferred that the system comprises at least three devices 10 like the device described above. This type of configuration is according to the usual stability requirements of the support, which is provided with at least three legs, and more frequently four legs, for this purpose.

Figure 3:
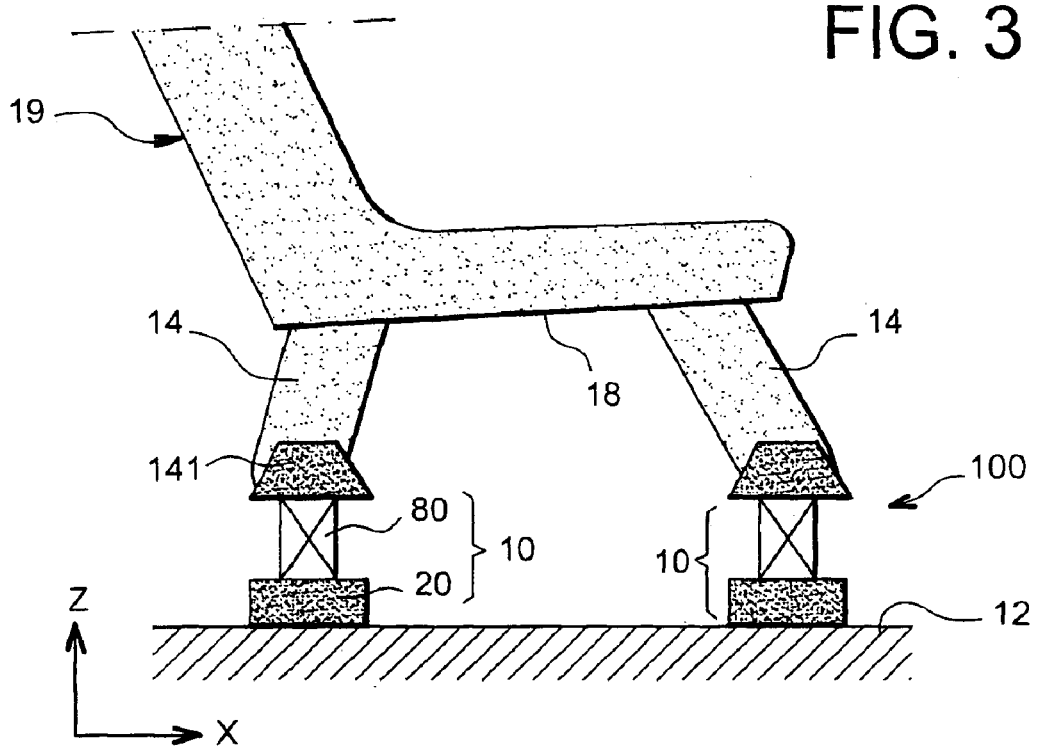
FIG. 3 shows a side view of an embodiment of the system according to the invention fitted on a passenger support, FIG. 4 corresponds to FIG. 3 for another embodiment of the system according to the invention fitted on a passenger support.
Figure 4:
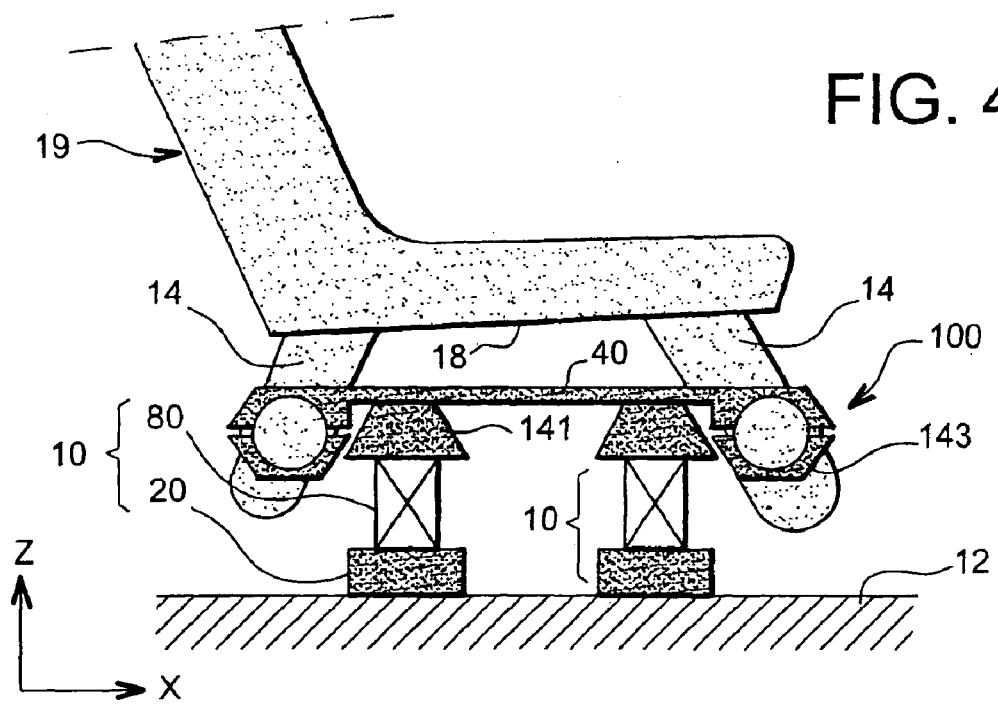

FIG. 3 shows a system 100 for filtering movements of a vehicle support 19, caused by vibrations from the floor 12 of the vehicle and transmitted to said support, that is fitted on a vehicle support 19 with a seat bottom 18 and provided with four legs 14 rigidly fastened to said seat bottom 18. A side view of the support 19 is shown, such that only the two legs 14 and two devices 10 are shown.

Every device 10 of the system 100 is installed under the corresponding leg 14 of the support 19, such that the rotation axes of the devices 10 are oriented so as to be parallel to each other, and perpendicular to the direction along which the movement to be filtered by the filtering system is propagated.

Therefore, when the vehicle is an aircraft, it is preferred that the rotation axes of the devices 10 are parallel to the direction of forward movement of the vehicle. According to the axes convention usually adopted for aircraft, the X direction is the forward direction of movement, and the Y direction is a transverse direction. Subsequently, the support 19 moves along an overall translation along a curved trajectory contained in a transverse plane of the vehicle.

Therefore, each device 10 is shown as a side view in FIG. 3 in a simplified manner by a mount 20, and an assembly 80 including the movable segments 24, 221, 223 and a clevis 141 to adapt the device 10 to the leg 14. Said clevis 141 may advantageously be the clevis that usually enables the leg of the support 19 to be fastened to the floor, when said support 19 is a seat that is not fitted with the device or system according to the invention.

This configuration of the system 100 has the advantage that there is no need to modify existing vehicle seats to fit them with the device or system according to the invention.

But this configuration of the system 100 sometimes has the disadvantage that it increases the height of the support 19.

An alternative system configuration is proposed to overcome this disadvantage. This configuration is showed in FIG. 4 and only its differences from FIG. 3 will be described.

According to this alternative, the system 100 comprises the devices 10, and also an intermediate common plate 40 fastened rigidly to the legs 14 of the support 19 by fastening means 143. This plate is installed at an intermediate height between the seat 18 of the support 19 and the plane of the floor 12, and is preferably parallel to the plane of the floor 12.

According to this alternative, the devices 10 are inserted between the floor 12 and said intermediate plate 40, that forms the lower part fixed to the seat bottom 18 of the support 19. The connection between the intermediate common plate 40 and each device 10 is a rotation joint. This rotation joint is made using a rotation axis 32 common to the longitudinal bar 221 of the "T" of the central part 22 and a clevis 141. According to one alternative not shown in FIG. 4, the rotation axis 32 is formed directly in the plate 40, for example in a manner similar to the manner used for axes 34 in the mounts 20.

Other possible alternative configurations of the system are not shown on the figures.

One alternative could be envisaged in which the common intermediate plate 40 is fastened directly to the seat bottom 18 of the support 19, rather than being fastened to the legs 14 of the support. In this case, it is even possible that the legs could be shortened or eliminated, while providing means of ensuring that the seat bottom 18 of the support 19 is at a standard height above the floor 12.

Another alternative could also be considered in which the lower part of the support itself is the seat bottom 18 of the support. In this case, the presence of an intermediate plate 40 is no longer necessary. Nor it is necessary that the legs 14 should be present. Once again, means must be provided to enable a sufficient height between the seat bottom 18 of the support 19 and the floor 12.

The device and the system according to the invention have just been described in an application for passenger supports in a vehicle. In particular, they are suitable for filtering vibrations affecting the seats of an aircraft.

They may be extended to cover other applications for other passenger furniture elements, such as a bed or a bench or a platform, or any support that will hold one or more passenger(s) and for which it is required to improve comfort under vibration conditions applied to this passenger or these passengers, remaining within the scope of the invention.

What is claimed is:

1. Articulated device (10) that will form part of a system (100) for filtering vibrational movements from a vehicle floor (12) and transmitted to a passenger support (19), characterised in that it is installed between said floor (12) and said support (19) in that it comprises the following five elements:

two mounts (20) fixed to the vehicle floor (12), one mobile central part (22) articulated to the support (19), two connecting rods (24), each articulated to one of the mounts (20) and to the central part (22), and in that these five elements (20, 22, 24) are articulated to each other and to the support (19) by rotation joints, the rotations operating about five rotation axes (34, 36, 32) parallel to each other, such that the rotation axis (32) between the mobile central part (22) and the support (19) moves in translation along a curved trajectory (160) contained in a (Y, Z) plane perpendicular to the plane of the floor (12).

2. Device (10) according to claim 1, characterised in that the central part (22) is in the shape of an inverted "T", and the five elements (20, 22, 24) are connected together and to the support (19) as follows:

each connecting rod (24) is connected to one of the mounts (20) through one of its ends and is able to rotate about a rotation axis (34) of said mount (20), each connecting rod (24) is connected to one of the ends of the transverse bar (223) of the "T" of the central part (22), at its other end, the connecting rod (24) and the central part (22) being able to rotate with respect to each other about a common rotation axis (36), the free end of the longitudinal bar (221) of the "T" of the central part (22) is connected to the support (19), the central part (22) and the support (19) being able to rotate with respect to each other about a common axis (32).

3. Device (10) according to claim 1, characterised in that at least one of the rotation axes (32, 34, 36) is rotatably supported by roller bearings.

4. Device (10) according to claim 1, characterised in that at least one of the rotation axes (32, 34, 36) is rotatably supported by journal bearings.

5. Device (10) according to claim 1, characterised in that at least one of the rotation axes (32, 34, 36) is rotatably supported by elastic pivots.

6. Device (10) according to claim 1, characterised in that it is installed under the support (19) such that rotation axes (32, 34, 36) are parallel to the forward direction of movement of the vehicle.

7. System (100) for filtering vibrational movements of a passenger support (19) in a vehicle, originating from the vehicle floor (12) and transmitted to the support (19), characterised in that it comprises at least three devices (10) according to claim 1.

8. System (100) for filtering vibrational movements of a passenger support (19) in a vehicle, originating from the vehicle floor (12) and transmitted to the support (19), characterised in that it comprises at least three devices (10) according to claim 2.

9. System (100) according to claim 7, characterised in that said devices (10) are configured such that all the rotation axes (32, 34, 36) in said devices (10) are parallel to each other.

10. System (100) according to claim 8, characterised in that said devices (10) are configured such that all the rotation axes (32, 34, 36) in said devices (10) are parallel to each other.

11. System according to claim 9, characterised in that said devices (10) are configured such that all the rotation axes (32, 34, 36) of said devices (10) are parallel to the plane (X, Y) of the vehicle floor (12).

12. System according to claim 10, characterised in that said devices (10) are configured such that all the rotation axes (32, 34, 36) of said devices (10) are parallel to the plane (X, Y) of the vehicle floor (12).

13. System (100) according to claim 11, characterised in that each device (10) is articulated between the floor (12) and one of the legs (14) of the support (19), and in that said system comprises one device (10) for each leg (14) of the support (19) on which it is installed.

14. System (100) according to claim 12, characterised in that each device (10) is articulated between the floor (12) and one of the legs (14) of the support (19), and in that said system comprises one device (10) for each leg (14) of the support (19) on which it is installed.

15. System (100) according to claim 13, characterised in that the central part (22) in each support (19) is articulated to a clevis (141) which in turn is attached to the corresponding leg (14) of the support (19).

16. System (100) according to claim 14, characterised in that the central part (22) in each support (19) is articulated to a clevis (141) which in turn is attached to the corresponding leg (14) of the support (19).

17. System (100) according to claim 11, characterised in that each device (10) is articulated between the floor (12) and an intermediate common plate (40) attached to the bottom seat (18) of the support (19) and installed between the vehicle floor (12) and the bottom seat (18) of the support (19), said plate (40) being rotatably articulated to the central part (22) of each device (10).

18. System (100) according to claim 12, characterised in that each device (10) is articulated between the floor (12) and an intermediate common plate (40) attached to the bottom seat (18) of the support (19) and installed between the vehicle floor (12) and the bottom seat (18) of the support (19), said plate (40) being rotatably articulated to the central part (22) of each device (10).

19. System (100) according to claim 17, characterised in that said intermediate common plate (40) is fastened to the legs (14) of the support (19).

20. System (100) according to claim 18, characterised in that said intermediate common plate (40) is fastened to the legs (14) of the support (19).

21. System (100) according to claim 17, characterised in that said intermediate common plate (40) is fastened to the bottom seat (18) of the support (19).

22. System (100) according to claim 18, characterised in that said intermediate common plate (40) is fastened to the bottom seat (18) of the support (19).

23. System (100) according to claim 17, characterised in that the central part (22) of each device (10) is articulated to a clevis (141) attached to said plate (40).

24. System (100) according to claim 18, characterised in that the central part (22) of each device (10) is articulated to a clevis (141) attached to said plate (40).

* * * * *